United States Patent [19]
Gui et al.

[11] Patent Number: 6,099,937
[45] Date of Patent: Aug. 8, 2000

[54] HIGH MOLECULAR WEIGHT FRACTIONED LUBRICANT FOR USE WITH THIN FILM MAGNETIC MEDIA

[75] Inventors: Jing Gui, Fremont; Bruno Jacques Marchon, Palo Alto, both of Calif.

[73] Assignee: Seagate Technology, Inc., Scotts Valley, Calif.

[21] Appl. No.: 09/075,656

[22] Filed: May 11, 1998

Related U.S. Application Data

[60] Provisional application No. 60/067,680, Dec. 5, 1997.

[51] Int. Cl.⁷ ....................................................... G11B 5/71
[52] U.S. Cl. .................... 428/141; 428/421; 428/65.4; 428/694 TF; 508/582; 528/490; 568/601; 568/604; 568/677
[58] Field of Search ..................... 428/141, 421, 428/65.4, 694 TF, 900; 508/582; 568/677; 528/490, 601, 604

[56] References Cited

U.S. PATENT DOCUMENTS

| 4,178,465 | 12/1979 | Caporiccio et al. | 568/601 |
| 5,292,585 | 3/1994 | Ohnuki et al. | 428/336 |
| 5,571,780 | 11/1996 | Silvani et al. | 508/582 |

*Primary Examiner*—Stevan A. Resan
*Attorney, Agent, or Firm*—Merchant & Gould P.C.

[57] ABSTRACT

Disclosed is a perfluoropolyether (PFPE) lubricant comprising less than about 10 percent PFPE molecules having a molecular weight lower than about 2000 Daltons, and wherein the average molecular weight of the lubricant is greater than about 5000 Daltons. Such a lubricant comprises less than about 15 percent PFPE molecules having a molecular weight greater than about 10,000 Daltons. Also disclosed is a thin film magnetic disc comprising a recording surface and a PFPE lubricant in contact with the recording surface. The recording surface of such a thin film magnetic disc can be adapted to magnetically record information via an air bearing read/write head. The recording surface can be smooth. The disc can further comprise a rough-surfaced landing zone inward of the recording surface, wherein the PFPE lubricant is in contact with the landing zone. Also disclosed is a method of lubricating a thin film magnetic disc. The method can comprise applying a narrow, high molecular weight fractionated PFPE lubricant to the disc. In addition, a method of preparing a PFPE lubricant for use with a thin film magnetic disc is disclosed. The method can comprise fractionating a PFPE lubricant to include less than about 10 percent PFPE molecules having a molecular weight lower than about 2000 Daltons. The average molecular weight of such a lubricant after fractionation is greater than about 5000 Daltons.

16 Claims, 3 Drawing Sheets

Smooth Data Zone

HIGH MOLECULAR WEIGHT FRACTIONED LUBRICANT FOR USE WITH THIN FILM MAGNETIC MEDIA

This application is based on U.S. provisional patent application, Ser. No. 60/067,680, filed Dec. 5, 1997, the entire contents of which are incorporated by reference herein. Throughout this application various publications are referenced. The disclosures of these publications in their entireties are incorporated by reference into this application in order to more fully describe the state of the art to which this invention pertains.

TECHNICAL FIELD OF THE INVENTION

The invention relates to a narrow, high molecular weight fractionated lubricant for use with thin film media. Use of the lubricant minimizes lubricant transfer to the head during flying.

BACKGROUND OF THE INVENTION

Computer disc drives typically use thin film media to store information in a high-density, high-reliability format. Thin film media can accommodate a high storage density, but thin films such as cobalt alloy films are significantly less durable than films composed of the magnetic and alumina particles used in particulate media. The durability of the disc is enhanced by application of a protective layer of very hard material over the cobalt alloy film. A typical protective layer is an overcoat of sputtered amorphous carbon about 100 Å to 250 Å thick. The amorphous carbon overcoat structure can be thought of as a hybrid between diamond and graphite. Other materials which have been used for overcoats include sputtered ceramic zirconium oxide and amorphous films of silicon dioxide.

The overcoat surface is usually lubricated to further reduce wear of the disc due to contact with the magnetic head assembly. Lubricant is typically applied evenly over the disc in a molecularly thin film having a thickness from 10 to 50 Å. Thicker films tend to be spun off by centrifugal forces. Slider-disc interaction, air shear and evaporation may also affect the amount of lubricant on a disc.

Disc surfaces have been textured to affect the tribology between the slider and the disc. A surface roughness of 50 to 350 Å peak-to-valley is typical. The texturing can be provided by texturing of any of the disc layers. For instance, the overcoat layer may be applied over a smooth surfaced magnetic layer, with the overcoat layer being mechanically textured prior to application of any of the covering layers. Each of the underlay, magnetic layer and overcoat are typically applied by sputtering to provide a very even thickness. Accordingly, when the underlayer, magnetic layer and overcoat are applied over a textured substrate, the texturing is transmitted through each of these layers, and the resultant surface of the overcoat layer retains most of the texturing of the substrate.

Magnetic discs in a computer disc drive which use an air bearing slider have two discrete zones which may be defined based on how the slider of the magnetic head assembly travels over the disc surface. A landing zone is the zone where the slider containing the read/write transducer lands, rests while the disc drive is off, and takes off from when the disc drive is started up. A data zone is the zone where the slider flies over the disc and stores magnetic data. Lubricant is generally applied to both the landing zone and the data zone on the magnetic disc.

When the power is switched on in a disc drive, enough force has to be applied to the slider to overcome the static friction or "stiction" force on the slider. During the relatively low speeds ecountered during takeoff and landing, the slider maintains almost constant contact with the disc. Lubricant over the landing zone is important for its contribution toward the stiction force and to minimize wear and drag force during takeoff and landing.

As the speed of the disc increases, the slider bears off the air in contact with the disc surface such that the magnetic head assembly becomes airborne. During use of the disc drive, the magnetic head assembly is designed to fly over the disc surface without contacting the disc. Occasionally, however, the magnetic head assembly contacts the disc during use of the disc drive. These in-flight contacts between the slider and the media, although infrequent, occur at high speeds. Most of these contacts are caused by collision of the slider with media asperities, third bodies such as corrosion products, or other contaminant particles. Lubricant on the data zone can minimize wear and damage to the disc caused by occasional contacts between the magnetic head assembly and the disc.

With thin film magnetic media, minimal spacing between the head and the media is essential for high density storage. As flying altitudes are decreased, the tribology between the slider and disc surface becomes more and more important. Typical read/write heads now fly over the disc surface at altitudes in the 10–30 nm range. As the flying height becomes increasingly low, more and more physical and chemical interactions take place between the head and the disc during flying.

One of these interactions is the gradual transfer of the liquid lubricant from the disc surface to the head. This lubricant can accumulate anywhere on the head slider, but it is usually confined near the trailing edge or in the cavity. When the slider comes to a rest after power off, this lubricant can migrate back to the head/disc gap, and the flooding of this interface creates a very high adhesive force between the head and the disc. This force is known as stiction force, and the phenomenon is referred to as fly/stiction. Fly/stiction can lead the disc drive to a spin-up failure, as the motor may not be strong enough to overcome the high stiction force.

While the tribology between a slider and a disc is a function of the properties of the substrate and all the deposited layers, the overcoat and the lubricant are of primary importance. The slider structure also greatly affects the tribology, and sliders are usually formed of fairly hard ceramics such as Mn—Zn ferrite, calcium titanate ($CaTiO_3$) and $Al_2O_3$—TiC.

The amount of stiction is a function of storage time as well as the normal force between the slider and the disc. The time dependency associated with the storage time is accredited to lubricant migration toward points of contact between the slider and the disc surface, resulting in meniscus forces which increase slowly over time. The time dependency of stiction may also be the result of increased elastic deformation of contacting asperities between the slider and disc surface, as well as the result of slow diffusion of ambient species, mainly water, into the lubricated junctions followed by displacement of lubricant from the meniscus.

One strategy to overcome the stiction problem has been to apply a light abrasive texture over the data zone, and a second roughness over the landing zone. This strategy is described in U.S. patent application Ser. No. 08/702,325, filed Aug. 22, 1996. A key to this thin-film media design is a light mechanical texture with a roughness average Ra greater than about 20 Å, as measured with an Atomic Force Microscope. However, as the flying altitude of the head continues to decrease, such a roughness on the disc surface becomes very undesirable because it can cause head-disc interference during the disc drive operation, leading to errors or even losses to the data.

The invention disclosed herein avoids the need for applying roughness to the disc surface by providing a lubricant comprising a narrow, high molecular weight fraction PFPE lubricant.

SUMMARY OF THE DISCLOSURE

Preferred embodiments of the invention provide a perfluoropolyether (PFPE) lubricant comprising less than about 10 percent PFPE molecules having a molecular weight lower than about 2000 Daltons, and wherein the average molecular weight of the lubricant is greater than about 5000 Daltons. In one embodiment, the lubricant comprises less than about 15 percent PFPE molecules having a moleuclar weight greater than about 10,000 Daltons. In one embodiment, the average molecular weight of the lubricant is less than about 7000 Daltons. In another embodiment, the lubricant comprises less than about 10% PFPE molecules having a molecular weight lower than about 3000 Daltons. In another embodiment, the lubricant comprises less than about 15 percent PFPE molecules having a moleuclar weight greater than about 9,000 Daltons. In another embodiment, the lubricant has been fractionated by supercritical fluid fractionation. In another embodiment, carbon dioxide has been used as a solvent in the supercritical fluid fractionation.

In one embodiment, the invention provides a thin film magnetic disc comprising a recording surface and a PFPE lubricant in contact with the recording surface. The PFPE lubricant comprises less than about 10 percent PFPE molecules having a molecular weight lower than about 2000 Daltons, and the average molecular weight of the lubricant is greater than about 5000 Daltons. In one embodiment, the lubricant comprises less than about 15 percent PFPE molecules having a molecular weight greater than about 10,000 Daltons. In another embodiment, the average molecular weight of the lubricant is less than about 7000 Daltons. In another embodiment, the lubricant comprises less than about 10% PFPE molecules having a molecular weight lower than about 3000 Daltons. In another embodiment, the lubricant comprises less than 15 percent PFPE molecules having a moleuclar weight greater than about 9,000 Daltons. In another embodiment, the lubricant has been fractionated by supercritical fluid fractionation. In another embodiment, carbon dioxide has been used as a solvent in the supercritical fluid fractionation.

In another embodiment, the invention provides a method of lubricating a thin film magnetic disc. The method comprises applying a PFPE lubricant to the disc, wherein the PFPE lubricant comprises less than about 10 percent PFPE molecules having a molecular weight lower than about 2000 Daltons, and wherein the average molecular weight of the lubricant is greater than about 5000 Daltons. In one embodiment, the lubricant comprises less than about 15 percent PFPE molecules having a moleuclar weight greater than about 10,000 Daltons. In another embodiment, the average molecular weight of the lubricant is less than about 7000 Daltons. In another embodiment, the lubricant comprises less than about 10% PFPE molecules having a molecular weight lower than about 3000 Daltons. In another embodiment, the lubricant comprises less than 15 percent PFPE molecules having a moleuclar weight greater than about 9,000 Daltons. In another embodiment, the lubricant has been fractionated by supercritical fluid fractionation. In another embodiment, carbon dioxide has been used as a solvent in the supercritical fluid fractionation. In another embodiment, the disc is adapted to magnetically record information via an air bearing read/write head.

In another embodiment, the invention provides a method of preparing a PFPE lubricant for use with a thin film magnetic disc. The method comprises fractionating a PFPE lubricant to include less than about 10 percent PFPE molecules having a molecular weight lower than about 2000 Daltons. The average molecular weight of the lubricant after fractionation is greater than about 5000 Daltons. In one embodiment, the method further comprises fractionating the PFPE lubricant to include less than about 15 percent PFPE molecules having a moleuclar weight greater than about 10,000 Daltons. In one embodiment, the average molecular weight of the lubricant after fractionation is less than about 7000 Daltons. In another embodiment, the lubricant after fractionation comprises less than about 10% PFPE molecules having a molecular weight lower than about 3000 Daltons. In another embodiment, the lubricant after fractionation comprises less than about 15 percent PFPE molecules having a moleuclar weight greater than about 9,000 Daltons. In another embodiment, the fractionation is supercritical fluid fractionation. In another embodiment, carbon dioxide is used as a solvent in the supercritical fluid fractionation.

DETAILED DESCRIPTION OF PREFERRED EMBODIMENTS

DEFINITIONS

All scientific and technical terms used in this application have meanings commonly used in the art unless otherwise specified. As used in this application, the following words or phrases have the meanings specified.

As used herein "perfluoropolyether" or "PFPE" lubricant means long chain polymers composed of repeat units of small perfluroinated aliphatic oxides such as perfluoroethylene oxide or perfluoropropylene oxide. Examples of commercially available PFPE polymers include, but are not limited to, Fomblin Z (random copolymer of $CF_2CF_2O$ and $CF_2O$ units) and Fomblin Y (random copolymer of $CF(CF_3)$ $CF_2O$ and $CF_2O$) and their functional derivates such as ZDOL, ZDOL TX, and ZTETRAOL (available from Montedison), Demnum (a homopolymer of $CF_2CF_2CF_2O$; available from Daikin), and Krytox (a homopolymer of $CF(CF_3)CF_2O$).

As used herein, "magnetic disc" means any disc having a magnetic layer in which information can be stored. In one embodiment, the disc is for use in a computer disc drive. In one embodiment, the magnetic layer of the disc is provided by a thin film such as a cobalt alloy film applied over a supporting substrate. One example of a supporting substrate is a nickel-phospohorous plated aluminum, which may be coated with a chromium underlayer for the magnetic media. In one embodiment, the thin film of cobalt alloy is applied at a thickness of about 500 Å over the substrate. In one embodiment, the disc has a protective layer applied over the magnetic layer. One example of a protective layer is an overcoat of sputtered amorphous carbon about 150 Å thick. Additional examples of protective overcoats include, but are not limited to, sputtered ceramic zirconium oxide and amorphous films of silicon dioxide.

As used herein, "recording surface" or "data zone" means a portion of the magnetic disc adapted to magnetically record information. In one embodiment, the magnetic recording occurs via a slider of a magnetic head assembly which travels over the disc surface. In one embodiment, the magnetic head assembly comprises an air bearing read/write head. A "data zone" is a zone where the slider flies over the disc and stores magnetic data. The recording surface or data zone can be smooth or rough. The lubricants of the invention are particularly suited for use with a disc having a smooth data zone. In one embodiment, the smooth data zone has a roughness average of less than about 15 Å. In one embodiment, the smooth data zone has a roughness average of less than about 10 Å.

As used herein, "landing zone" means a zone where the slider rests while the disc drive is off, and takes off from when the disc drive is started up. The landing zone is typically inward from the data zone, and is typically rough-surfaced relative to the data zone. The landing zone can also be an outer edge portion of the disc. In one embodiment, the landing zone has a roughness average of greater than about 100 Å.

LUBRICANTS

Figure 1:
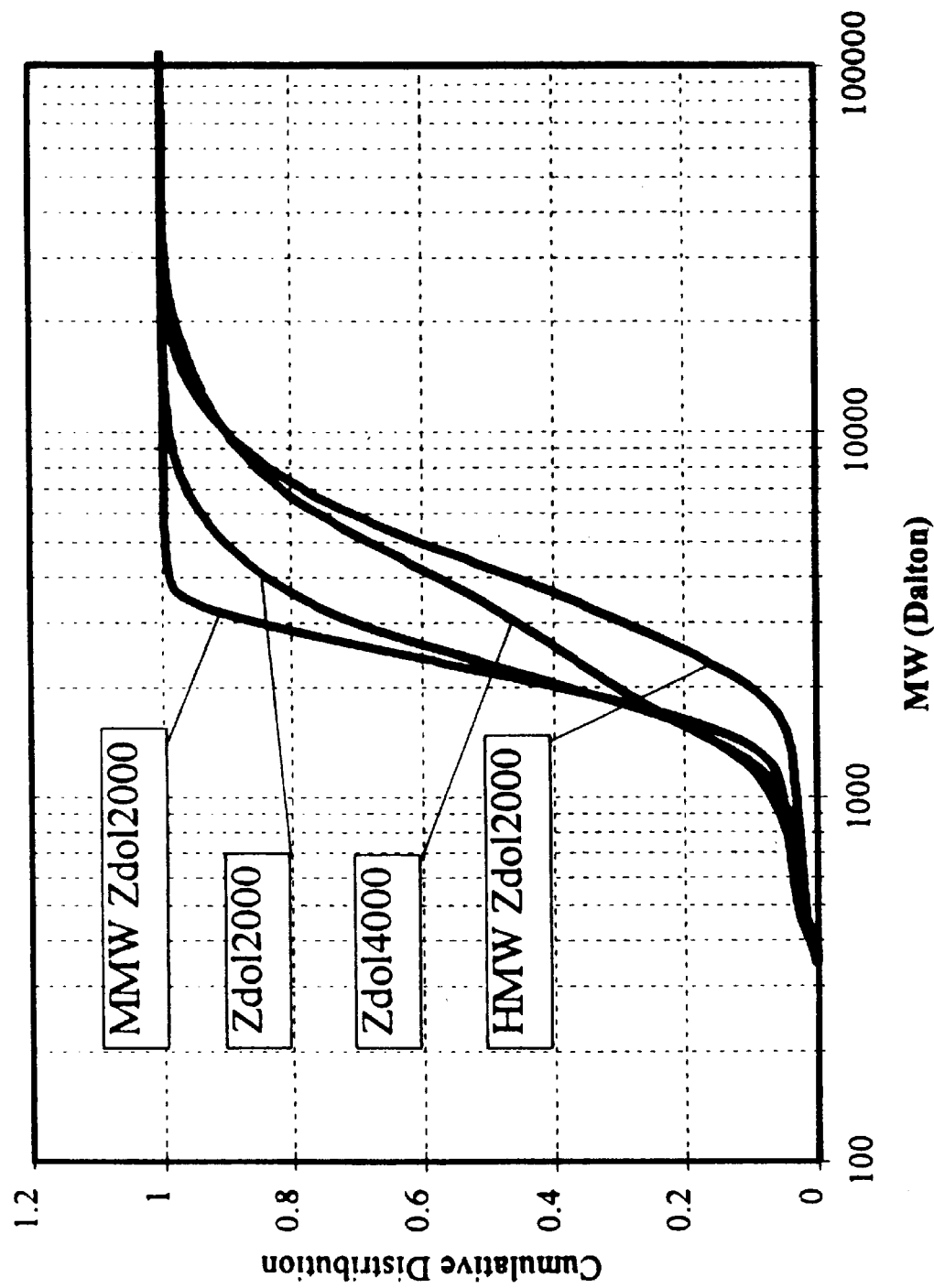
FIG. 1 shows the cumulative molecular weight distribution of various Zdol materials, measured by supercritical fluid chromatography.

In one embodiment, the invention provides a narrow, high molecular weight fractionated lubricant, suitable for use with thin film magnetic discs. In one embodiment, the lubricant is a PFPE lubricant. In one embodiment, the PFPE lubricant is a functional Fomblin lubricant, such as ZDOL. In one embodiment, the number average molecular weight, Mn, of this narrow PFPE fraction is greater than about 5,000 Daltons. Preferably, this PFPE fraction does not contain more than about 10% of PFPE molecules that have molecular weight lower than about 2,000 Daltons. In one embodiment, this fraction contains less than about 15% of molecules that have molecular weight greater than 10,000 Daltons. This latter restriction permits maintainenance of good wear performance. The cumulative molecular weight distribution of various ZDOL, preparations is illustrated in FIG. 1. The preferred high molecular weight fraction is indicated as HMW Zdol 2000.

The molecular weight distribution is a particularly important feature of the lubricant, such that a narrower distribution is preferred. Preferably, at least 75% of the molecular weight distribution falls between about 2,000 Daltons and about 10,000 Daltons. In one embodiment, at least 90% of the molecular weight distribution falls between about 2,000 Daltons and about 10,000 Daltons. Minimization of the distribution below 2,000 Daltons is more important to elimination of fly/stiction problems.

Also important, although to a lesser extent than molecular weight distribution, is a high average molecular weight. In one embodiment, the number average molecular weight of the lubricant is about 6,000 Daltons. An average molecular weight greater than about 7,000 Daltons, however, would likely be of too high viscosity.

PREPARATION OF LUBRICANT

Lubricants can be prepared by fractionation of a commercially available lubricant such as a PFPE lubricant. PFPEs are currently the preferred lubricant for thin film recording media. PFPEs are long chain polymers composed of repeat units of small perfluorinated aliphatic oxides such as perfluoroethylene oxide or perfluoropropylene oxide. As a class of compounds, PFPEs provide excellent lubricity, a wide liquid-phase temperature range, low vapor pressure, small temperature dependency of viscosity, high thermal stability, and low chemical reactivity. PFPEs also exhibit low surface tension, resistance to oxidation at high temperature, low toxicity, and moderately high solubility for oxygen.

Examples of commercially available PFPE polymers include, but are not limited to, Fomblins Z (random copolymer of $CF_2CF_2O$ and $CF_2O$ units) and Y (random copolymer of $CF(CF_3)CF_2O$ and $CF_2O$) as well as their functional derivatives such as ZDOL, ZDOL, TX, and ZTETRAOL (available from Montedison), Demnum (a homopolymer of $CF_2CF_2CF_2O$; available from Daikin), and Krytox (a homopolymer of $CF(CF_3)CF_2O$). See P. H. Kasai, Adv. Info. Storage Syst., 4:291 (1992). In a preferred embodiment, the PFPE lubricant to be fractionated is a ZDOL lubricant such as ZDOL 2000, ZDOL 3000 or ZDOL 4000 (Montedison).

Fomblins Z and Y are prepared by photo-oxidation of tetrafluoroethylene and hexafluoropropylene, respectively, and are random copolymers. Krytox and Demnum are synthesized via base catalyzed polymerization of perfluoropropylene oxide and trimethylene oxide, respectively. See U.S. Pat. Nos. 3,242,218 and 3,665,041. Commercially available PFPEs generally have a very broad molecular weight distribution. Lubricants are available in a number of average molecular weights, such as 2000 Daltons (e.g., ZDOL 2000).

The high molecular weight PFPE with a narrow molecular weight distribution can be obtained by a variety of conventional techniques such as supercritical fluid fractionation (Encyclopedia of Polymer Science and Engineering, 2nd Ed., Vol. 16, p. 368, J. Wiley and Sons, 1989). The starting materials can be any commercial lubricants, preferably a functional PFPE lubricant such as Zdol 2000, Zdol 3000 or Zdol 4000.

Supercritical fluid fractionation is achieved by solubility differences between the moleucles of various molecular weights within the polymer compound. Liquid polymer is continually fed to an extraction vessel where the polymer is dissolved in a supercritical fluid appropriate for the polymer. For PFPEs, supercritical carbon dioxide is an appropriate solvent. All of the oligomers in PFPEs are soluble in supercritical carbon dioxide, although the solubility of each oligomer is affected by the presence of the other oligomers. By subsequent stepwise pressure reduction of the steam leaving the extraction vessel, the PFPE is fractionated into low polydispersity fractions. The number of fractions and the polydispersity of each fraction is a function of the number of pressure reduction stages and the pressure reduction ratio in each stage. Other techniques to fractionate fluids include molecular distillation and fraction precipitation using antisolvents.

METHODS

In one embodiment, the invention provides a method of lubricating a thin film magnetic disc. The method comprises applying a narrow, high molecular weight fraction PFPE lubricant to the disc. The lubricant is typically applied to both the landing zone and the data zone of the disc. The lubricant is typically applied in an unbonded layer of a molecularly thin film having a thickness of about 10 to about 30 Å. The lubricant also can be applied in a bonded layer.

In one embodiment, the PFPE lubricant comprises less than about 10 percent PFPE molecules having a molecular weight lower than about 2000 Daltons, and wherein the average molecular weight of the lubricant is greater than about 5000 Daltons. In one embodiment, the lubricant comprises less than about 15 percent PFPE molecules having a moleuclar weight greater than about 10,000 Daltons. In another embodiment, the average molecular weight of the lubricant is less than about 7000 Daltons. In another embodiment, the lubricant comprises less than about 10% PFPE molecules having a molecular weight lower than about 3000 Daltons. In another embodiment, the lubricant comprises less than 15 percent PFPE molecules having a moleuclar weight greater than about 9,000 Daltons. In another embodiment, the lubricant has been fractionated by supercritical fluid fractionation. In another embodiment, carbon dioxide has been used as a solvent in the supercritical fluid fractionation.

In another embodiment, the disc is adapted to magnetically record information via an air bearing read/write head. In one embodiment, the disc is for use in a computer disc drive. Those skilled in the art will appreciate how the lubricant and methods of the invention can be incorporated into a method for manufacturing a disc, such as a thin film magnetic disc.

DISCS

In another embodiment, the invention provides a thin film magnetic disc comprising a recording surface and a narrow, high molecular weight fractionated lubricant in contact with the recording surface. In one embodiment, the lubricant is a PFPE lubricant. The PFPE lubricant comprises less than about 10 percent PFPE molecules having a molecular weight lower than about 2000 Daltons, and the average molecular weight of the lubricant is greater than about 5000 Daltons. In one embodiment, the lubricant comprises less than about 15 percent PFPE molecules having a molecular weight greater than about 10,000 Daltons. In another embodiment, the average molecular weight of the lubricant is less than about 7000 Daltons. In another embodiment, the lubricant comprises less than about 10% PFPE molecules having a molecular weight lower than about 3000 Daltons. In another embodiment, the lubricant comprises less than 15 percent PFPE molecules having a moleuclar weight greater than about 9,000 Daltons. In another embodiment, the lubricant has been fractionated by supercritical fluid fractionation. In another embodiment, carbon dioxide has been used as a solvent in the supercritical fluid fractionation.

The recording surface of the thin film magnetic disc can be adapted to magnetically record information via an air bearing read/write head. In one embodiment, the recording surface is smooth. In another embodiment, the recording surface has a roughness average of less than about 15 Å. In another embodiment, the disc further comprises a rough-surfaced landing zone inward of the recording surface, wherein the PFPE lubricant is in contact with the landing zone. In one embodiment, the landing zone has a roughness average of greater than about 100 Å.

ADVANTAGES OF THE DISCLOSED EMBODIMENTS

In preferred embodiments, the invention provides a lubricant that overcomes fly/stiction between a read/write head and a thin film disc having a smooth data zone, which happens after an extended period of flying over the data zone, and subsequent resting over the landing zone. Lubricant transfer, and hence fly/stiction, is greatly reduced when a narrow, high molecular weight fraction of Zdol 2000 is used. Such a lubricant dramatically reduces fly/stiction without resorting to a light mechanical texture on the disc surface. This objective is accomplished without compromising good wear durability.

A lubricant as disclosed herein is suitable for use with a disc having a smooth data zone, permitting a higher recording density and avoiding the need to apply a light mechanical texture to the disc. The ability to use such a lubricant with a disc having a smooth data zone allows for greater flexibility than is possible with discs having a light mechanical texture. For example, it is sometimes desirable to thermally bond the lubricant to the disc surface, which creates problems with rough-surfaced discs. Thermal bonding is not a problem with smooth discs, such as discs lubricated in accordance with the invention. A lubricant as disclosed herein, because it is robust, also provides more flexibility in selection of the magnetic head assembly for use with the disc. For example, it is not necessary to use a carbon overcoated magneto-resistive head to avoid stiction problems.

The following examples are presented to illustrate embodiments of the invention and to assist one of ordinary skill in making and using the same. The examples are not intended in any way to otherwise limit the scope of the invention.

EXAMPLE 1

Comparative Performance of High and Middle Molecular Weight Fractions of Zdol 2000

Figure 2:
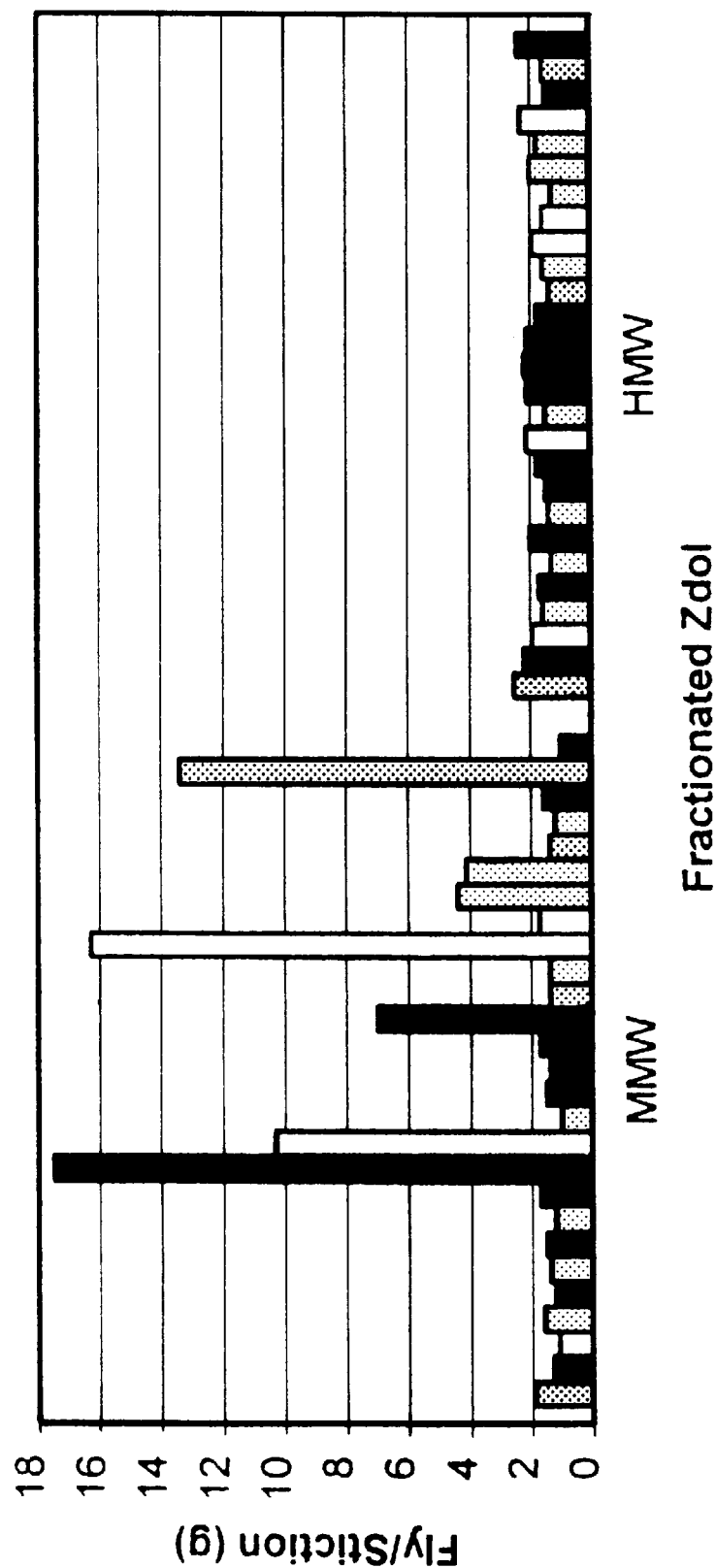
FIG. 2 shows a fly/stiction comparison between the medium molecular weight Zdol fraction and the high molecular weight Zdol on discs having a smooth data zone.

The narrow, middle portion of Zdol 2000, in combination with a light mechanical texture on the disc, provides satisfactory fly/stiction performance. However, in the absence of such a light mechanical texture, fly/stiction is no longer satisfactory. The role of the light mechanical texture is to reduce vapor pressure, hence lubricant transfer, near the surface via a capillary effect. In this Example, use of a Zdol 2000 fraction that has lower vapor pressure than that of the middle portion of Zdol 2000 is tested. The lower vapor pressure is achieved by using a high molecular weight portion of Zdol 2000 prepared by supercritical fluid fractionation as described in Encyclopedia of Polymer Science and Engineering, 2nd Ed., Vol. 16, p. 368, J. Wiley and Sons, 1989. Use of a fraction having a lower vapor pressure can reduce lubricant transfer without relying on the capillary effect of the light mechanical texture. A comparison of fly/stiction performance of discs lubricated with the middle molecular weight portion and with the high molecular weight portion of Zdol 2000 is illustrated in FIG. 2. The high molecular weight fraction of Zdol 2000 has no fly/stiction problem, whereas the middle molecular weight fraction shows a significant amount of fly/stiction failures (>5.0g).

EXAMPLE 2

Figure 3:
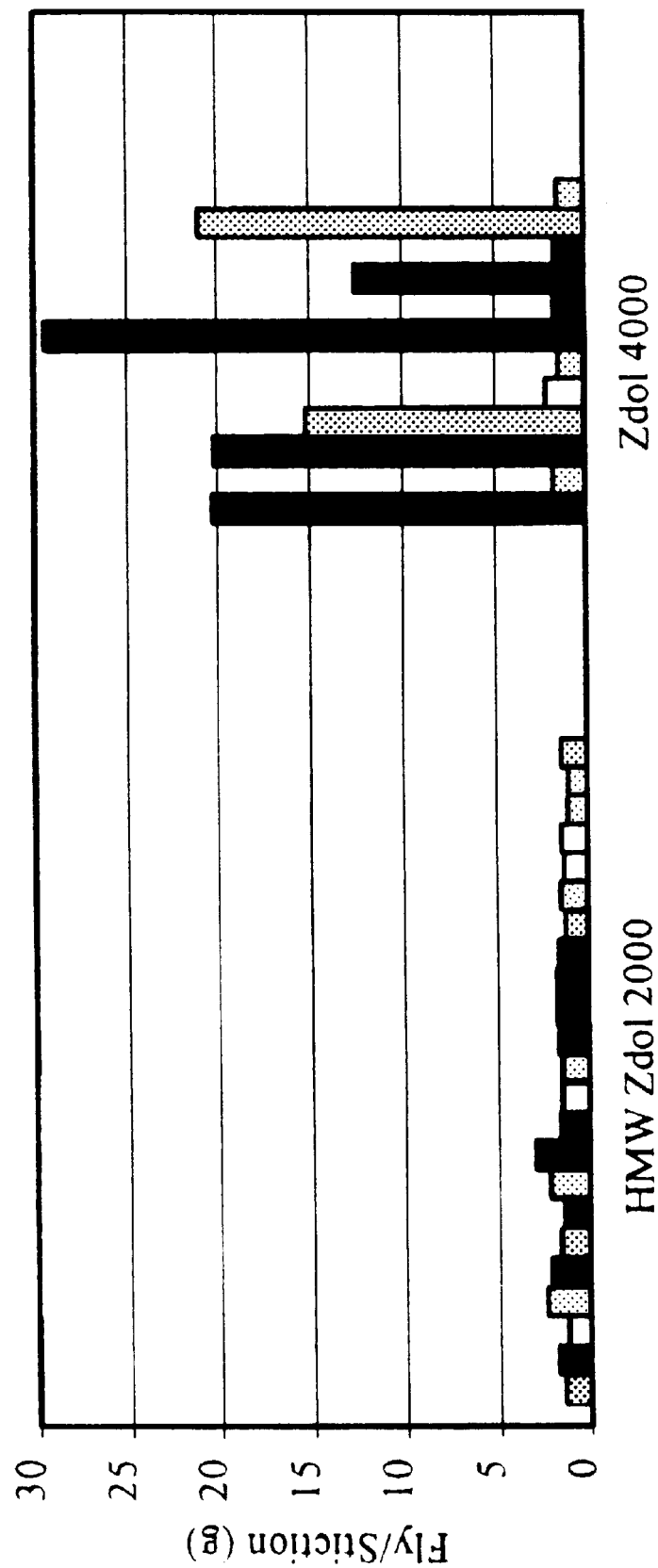
FIG. 3 shows a fly/stiction comparison between high molecular weight Zdol 2000 and unfractionated Zdol 4000 on discs having a smooth data zone.

Comparative Performance of Commercial Lubricant Having High Average Molecular Weight Versus Narrow, High Molecular Weight Fractionated Lubricant This Example illustrates the advantage of controlling the low molecular weight tail of the lubricant fraction. Improved performance is achieved when the average molecular weight of the fraction is higher than about 5,000 and the low molecular weight tail (lower than about 2,000 Daltons) of the distribution is limited below 10%. A comparison was made of fly/stiction performance between the commercial Zdol 4000, which has an average molecular weight of 4000 Daltons, and the high molecular weight Zdol 2000. The results of this comparison are shown in FIG. 3. Zdol 4000 did not perform as well as the high molecular weight Zdol 2000. In fact, for this particular lot of Zdol 4000, its performance is worse than that of medium molecular weight Zdol 2000. An explanation for this result can be found in FIG. 1, which shows more low molecular weight materials in Zdol 4000 than in the medium molecular weight Zdol 2000. Just as the low molecular weight component should be limited, the molecular weight of a lubricant for disc application cannot be excessively high, as sufficient lube mobility is required for disc durability. A lubricant as disclosed herein accommodates the need for wear performance.

What is claimed is:

1. A perfluoropolyether (PFPE) lubricant comprising less than about 10 percent PFPE molecules having a molecular weight lower than about 3000 Daltons, and less than about 15 percent PFPE molecules having a moleuclar weight greater than about 10,000 Daltons, and wherein the average molecular weight of the lubricant is greater than about 5000 Daltons and less than about 7000 Daltons.

2. The PFPE lubricant of claim 1, wherein the lubricant comprises less than about 15 percent PFPE molecules having a moleuclar weight greater than about 9,000 Daltons.

3. The PFPE lubricant of claim 1, wherein the lubricant has been fractionated by supercritical fluid fractionation.

4. The PFPE lubricant of claim 3, wherein carbon dioxide has been used as a solvent in the supercritical fluid fractionation.

5. A thin film magnetic disc comprising a recording surface and a PFPE lubricant in contact with the recording surface, wherein the PFPE lubricant comprises less than about 10 percent PFPE molecules having a molecular weight lower than about 2000 Daltons, and wherein the average molecular weight of the lubricant is greater than about 5000 Daltons.

6. The thin film magnetic disc of claim 5, wherein the lubricant comprises less than about 15 percent PFPE molecules having a moleuclar weight greater than about 10,000 Daltons.

7. The thin film magnetic disc of claim 5, wherein the average molecular weight of the lubricant is less than about 7000 Daltons.

8. The thin film magnetic disc of claim 5, wherein the lubricant comprises less than about 10% PFPE molecules having a molecular weight lower than about 3000 Daltons.

9. The thin film magnetic disc of claim 5, wherein the lubricant comprises less than 15 percent PFPE molecules having a moleuclar weight greater than about 9,000 Daltons.

10. The thin film magnetic disc of claim 5, wherein the lubricant has been fractionated by supercritical fluid fractionation.

11. The thin film magnetic disc of claim 10, wherein carbon dioxide has been used as a solvent in the supercritical fluid fractionation.

12. The thin film magnetic disc of claim 5, wherein the recording surface is adapted to magnetically record information via an air bearing read/write head.

13. The thin film magnetic disc of claim 12, wherein the recording surface has a roughness average of less than about 12 Å.

14. The thin film magnetic disc of claim 12, further comprising a landing zone inward of the recording surface, wherein the PFPE lubricant is in contact with the landing zone.

15. The thin film magnetic disc of claim 14, wherein the landing zone has a roughness average of greater than about 100 Å.

16. A method of lubricating a thin film magnetic disc, the method comprising applying a PFPE lubricant to the disc, wherein the PFPE lubricant comprises less than about 10 percent PFPE molecules having a molecular weight lower than about 2000 Daltons, and wherein the average molecular weight of the lubricant is greater than about 5000 Daltons.

* * * * *

UNITED STATES PATENT AND TRADEMARK OFFICE
CERTIFICATE OF CORRECTION

PATENT NO. : 6,099,937
DATED : August 8, 2000
INVENTOR(S) : Gui et al.

It is certified that error appears in the above-identified patent and that said Letters Patent is hereby corrected as shown below:

Title page,
Item [54], "FRACTIONED" should read -- FRACTIONATED --

Column 10,
Line 20, "12Å" should read -- 15Å --

Signed and Sealed this

Thirtieth Day of April, 2002

*Attest:*

JAMES E. ROGAN
*Attesting Officer*     *Director of the United States Patent and Trademark Office*